(12) United States Patent
Qin

(10) Patent No.: US 11,412,270 B2
(45) Date of Patent: Aug. 9, 2022

(54) METHOD AND APPARATUS FOR PROCESSING MULTIMEDIA FILE, STORAGE MEDIUM, AND ELECTRONIC APPARATUS

(71) Applicant: Tencent Technology (Shenzhen) Company Limited, Shenzhen (CN)

(72) Inventor: Zhi Qin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/900,579

(22) Filed: Jun. 12, 2020

(65) Prior Publication Data

US 2020/0344497 A1 Oct. 29, 2020

Related U.S. Application Data

(63) Continuation of application No. PCT/CN2019/079269, filed on Mar. 22, 2019.

(30) Foreign Application Priority Data

Mar. 28, 2018 (CN) .......................... 201810265191.2

(51) Int. Cl.
*H04N 21/218* (2011.01)
*G06F 16/435* (2019.01)
(Continued)

(52) U.S. Cl.
CPC ....... *H04N 21/2181* (2013.01); *G06F 16/435* (2019.01); *H04N 21/236* (2013.01); *H04N 21/2387* (2013.01)

(58) Field of Classification Search
CPC ............. H04N 21/2181; H04N 21/236; H04N 21/2387; G06F 16/435
See application file for complete search history.

(56) References Cited

U.S. PATENT DOCUMENTS 6,243,497 B1 * 6/2001 Chiang ................ H04N 19/152
375/E7.218
6,948,127 B1 * 9/2005 Zhu ..................... G06F 11/3664
382/232

(Continued)

FOREIGN PATENT DOCUMENTS

CN WO 2015190893 A1 12/2015
CN 105306960 A 2/2016
(Continued)

OTHER PUBLICATIONS

Chinese Office Action dated Jul. 11, 2019 in Chinese Application No. 201810265191.2, with English translation, 15 pgs.

(Continued)

*Primary Examiner* — James R Sheleheda
(74) *Attorney, Agent, or Firm* — Arentfox Schiff LLP

(57) ABSTRACT

A method for processing a multimedia file is described. The method includes obtaining a source slice media file included in a source multimedia file, and obtaining, by processing circuitry of a transcoding device, a slice pre-processing result corresponding to the source slice media file, the slice pre-processing result indicating a storage address of an image area processing result of the source slice media file, in a pre-processing device. The method also includes obtaining, by the processing circuitry of the transcoding device, the image area processing result of the source slice media file from the storage address. Finally, the method includes processing, by the processing circuitry of the transcoding device, the source slice media file according to the image area processing result, to obtain a processed target slice media file.

17 Claims, 7 Drawing Sheets

(51) Int. Cl.
*H04N 21/236* (2011.01)
*H04N 21/2387* (2011.01)

(56) References Cited

U.S. PATENT DOCUMENTS

| | | | | |
|---|---|---|---|---|
| 8,396,114 | B2* | 3/2013 | Gu | H04N 21/4621 |
| | | | | 370/235 |
| 9,338,467 | B1* | 5/2016 | Gadepalli | H04N 19/436 |
| 10,638,135 | B1* | 4/2020 | Wei | H04N 19/167 |
| 2001/0047517 | A1 | 11/2001 | Christopoulos et al. | |
| 2009/0296810 | A1* | 12/2009 | Kong | H04N 19/61 |
| | | | | 375/E7.243 |
| 2010/0128796 | A1* | 5/2010 | Choudhury | H04N 19/174 |
| | | | | 375/E7.026 |
| 2010/0189183 | A1* | 7/2010 | Gu | H04N 21/8456 |
| | | | | 375/E7.154 |
| 2010/0232504 | A1* | 9/2010 | Feng | H04N 19/17 |
| | | | | 375/E7.243 |
| 2012/0230398 | A1* | 9/2012 | Segall | H04N 19/44 |
| | | | | 375/E7.027 |
| 2012/0250755 | A1* | 10/2012 | Ratner | H04N 19/436 |
| | | | | 375/240.01 |
| 2012/0314948 | A1* | 12/2012 | Raveendran | H04N 19/59 |
| | | | | 382/173 |
| 2013/0104177 | A1* | 4/2013 | Kwan | H04N 21/234 |
| | | | | 725/93 |
| 2013/0114703 | A1* | 5/2013 | DeForest | H04N 19/20 |
| | | | | 375/240.08 |
| 2014/0092963 | A1* | 4/2014 | Wang | H04N 19/50 |
| | | | | 375/240.12 |
| 2014/0301464 | A1 | 10/2014 | Wu et al. | |
| 2015/0127778 | A1* | 5/2015 | De Vleeschauwer | |
| | | | | H04L 65/4084 |
| | | | | 709/219 |
| 2016/0034306 | A1* | 2/2016 | Galdy | G06F 9/5066 |
| | | | | 718/104 |
| 2016/0241863 | A1 | 8/2016 | Wu et al. | |
| 2017/0078376 | A1* | 3/2017 | Coward | H04N 19/436 |
| 2017/0078574 | A1* | 3/2017 | Puntambekar | H04N 5/23254 |
| 2020/0396464 | A1* | 12/2020 | Shah | H04N 19/146 |

FOREIGN PATENT DOCUMENTS

| | | |
|---|---|---|
| CN | 106254868 A | 12/2016 |
| CN | 106791928 A | 5/2017 |
| CN | 108600863 A | 9/2018 |
| EP | 2 717 254 A1 | 4/2014 |
| WO | WO 00/79801 A1 | 12/2000 |

OTHER PUBLICATIONS

International Search Report dated Jun. 17, 2019 in International Application No. PCT/CN2019/079269, with English translation, 5 pages.
European Search Report dated Oct. 7, 2020 in European Application No. 19774968.2, 13 pgs.

* cited by examiner

METHOD AND APPARATUS FOR PROCESSING MULTIMEDIA FILE, STORAGE MEDIUM, AND ELECTRONIC APPARATUS

RELATED APPLICATION

This application is a continuation of International Application No. PCT/CN2019/079269, filed on Mar. 2, 2019, which claims priority to Chinese Patent Application No. 201810265191.2, filed on Mar. 28, 2018, and entitled "METHOD AND APPARATUS FOR PROCESSING MULTIMEDIA FILE, STORAGE MEDIUM, AND ELECTRONIC APPARATUS." The entire disclosures of the prior applications are hereby incorporated by reference in their entirety.

FIELD OF THE TECHNOLOGY

This application relates to the computer field, and specifically, to a method and an apparatus for processing a multimedia file, a storage medium, and an electronic apparatus.

BACKGROUND OF THE DISCLOSURE

To reduce the size of a transport stream of a multimedia file with high definition, in the related an, a method for intelligent processing of a to-be-transmitted multimedia file is provided. For example, a data frame image in an obtained source multimedia file is processed, to obtain an important area in the data frame image. High definition of the important area is maintained, and definition of other areas is reduced, so as to reduce the size of the transport stream of the multimedia file.

However, during the intelligent processing, only the entire source multimedia file can be intelligently analyzed. The source multimedia file can be further processed only after a result of intelligently analyzing the entire source multimedia file is obtained. The intelligent analysis generally involves deep learning of the multimedia file, and the learning process is highly time-consuming. As a result, the speed of processing the multimedia file is significantly a affected, leading to a problem of relatively low efficiency of processing the multimedia file.

For the foregoing problem, no effective solution has been described currently.

SUMMARY

Embodiments of the disclosure provide a method and an apparatus for processing a multimedia file, a non-transitory computer-readable storage medium, and an electronic apparatus, to at least resolve a technical problem of relatively low processing efficiency in a method for processing a multimedia file in the related art.

In an embodiment, a method for processing a multimedia file includes obtaining a source slice media file included in a source multimedia file, and obtaining, by processing circuitry of a transcoding device, a slice pre-processing result corresponding to the source slice media file, the slice pre-processing result indicating a storage address of an image area processing result of the source slice media file, in a pre-processing device. The method further includes obtaining, by the processing circuitry of the transcoding device, the image area processing result of the source slice media file from the storage address. Finally, the method includes processing, by the processing circuitry of the transcoding device, the source slice media file according to the image area processing result, to obtain a processed target slice media file.

In an embodiment, before the obtaining the source slice media file included in the source multimedia file, the method further includes transmitting, by a control device, a slice pre-processing task corresponding to the source slice media file to the pre-processing device, so that the pre-processing device performs key area recognition on at least one frame image of the source slice media file according to the slice pre-processing task, and stores the image area processing result obtained through the key area recognition.

In an embodiment, before the transmitting, the method further includes determining, by the control device, the pre-processing device corresponding to the source slice media file from a pre-processing device cluster, a ratio of a quantity of source slice media files in the source multimedia file to a quantity of pre-processing devices in the pre-processing device cluster being N:M, being a natural number greater than 1, and M being a natural number greater than 1.

In an embodiment, the processing includes obtaining, by the processing circuitry of the transcoding device, a key area in a frame image included in the source slice media file according to the image area processing result. The processing also includes performing, by the processing circuitry of the transcoding device, a first operation on the key area, and performing a second operation on areas of the frame image other than the key area, the first operation and the second operation being different operations.

In an embodiment, the performing, by the processing circuitry of the transcoding device, the first operation on the key area, and the performing the second operation on areas of the frame image other than the key area includes performing, by the processing circuitry of the transcoding device, an encoding processing operation on the key area according to a first bit rate. The performing the first operation on the key area, and the performing the second operation on areas of the frame image other than the key area also includes performing, by the processing circuitry of the transcoding device, the encoding processing operation an the areas of the frame image other than the key area according to a second bit rate. The first bit rate is greater than the second bit rate.

In an embodiment, after the processing, the method further includes combining, by the processing circuitry of the transcoding device, target slice media files respectively corresponding to source slice media files included in the source multimedia file, to obtain a target multimedia file corresponding to the source multimedia file. Finally, the method includes transmitting the target multimedia file to a playing client for playing.

In an embodiment, the obtaining the image processing result includes obtaining plural image processing results corresponding to plural source slice media files of the source multimedia file respectively from different pre-processing devices of the pre-processing device cluster, the different pre-processing devices outputting the plural image processing results in parallel.

In an embodiment, a method for processing a multimedia file includes obtaining a source slice media file included in a source multimedia file, and obtaining a slice pre-processing task corresponding to the source slice media file. The method also includes obtaining, by processing circuitry of a pre-processing device, an image area processing result corresponding to the source slice media file according to the slice pre-processing task. Finally, the method includes transmitting the image area processing result to a transcoding device, so that the transcoding device processes the source slice media file according to the image area processing result, to obtain a processed target slice media file.

In an embodiment, the obtaining, by the processing circuitry of the pre-processing device, the image area processing result corresponding to the source slice media file according to the slice pre-processing task includes performing, by the processing circuitry of the pre-processing device, key area recognition on a frame image included in the source slice media file according to the slice pre-processing task. Finally, the obtaining the image area processing result also includes storing the image area processing result obtained through the key area recognition.

In an embodiment, the transmitting includes obtaining an obtaining request transmitted by the transcoding device, the obtaining request carrying a storage address used for indicating the image area processing result. The transmitting also includes storing, by processing circuitry of the pre-processing device, the image area processing result in the storage address.

In an embodiment, before the obtaining the source slice media file in the source multimedia file, the method further includes determining, by a control device, the pre-processing device corresponding to the source slice media file from a pre-processing device cluster, a ratio of a quantity of source slice media files in the source multimedia file to a quantity of pre-processing devices in the pre-processing device cluster being, N:M, N being a natural number greater than 1, and M being a natural number greater than 1.

In an embodiment, the ratio of N to M is equal to or greater than 1.

In an embodiment, an apparatus for processing a multimedia file includes processing circuitry configured to obtain a source slice media file in a source multimedia file, and obtain a slice pre-processing result corresponding to the source slice media file, the slice pre-processing result indicating a storage address of an image area processing result of the source slice media file, in a pre-processing device. The processing circuitry is further configured to obtain the image area processing result of the source slice media file from the storage address, and process the source slice media file according to the image area processing result, to obtain a processed target slice media file.

In an embodiment, the image area processing result is obtained by a pre-processing device performing key area recognition on at least one frame image of the source slice media file.

In an embodiment, the pre-processing device is selected from a pre-processing device cluster, a ratio of a quantity of source slice media files in the source multimedia file to a quantity of pre-processing devices in the pre-processing device cluster being N:M, N being a natural number greater than 1, and M being a natural number greater than 1.

In an embodiment, the processing circuit is further configured to obtain plural image processing results corresponding to plural source slice media files of the source multimedia file respectively from different pre-processing devices of the pre-processing device cluster, the different pre-processing devices outputting the plural image processing results in parallel.

In an embodiment, the processing circuitry processes the source slice media file by obtaining a key area in a frame image included in the source slice media file according to the image area processing result. Next, the processing circuitry processes the source slice media file by performing a first operation on the key area, and performing a second operation on areas of the frame image other than the key area, the first operation and the second operation being different operations.

In an embodiment, the processing circuitry performs the first operation on the key area, and performs the second operation on areas of the frame image other than the key area by performing an encoding processing operation on the key area according to a first bit rate, and performing the encoding processing operation on the areas of the frame image other than the key area according to a second bit rate. The first bit rate is greater than the second bit rate.

In an embodiment, a non-transitory computer-readable storage medium, storing computer-readable instructions, which, when executed by processing circuitry of a transcoding device, causes the transcoding device to perform a method for processing, a multimedia file. The method includes obtaining a source slice media file included in a source multimedia file, and obtaining, by processing circuitry of a transcoding device, a slice pre-processing result corresponding to the source slice media file, the slice pre-processing result indicating a storage address of an image area processing result of the source slice media file, in a pre-processing device. The method further includes obtaining, by the processing circuitry of the transcoding device, the image area processing result of the source slice media file from the storage address. Finally, the method includes processing, by the processing circuitry of the transcoding device, the source slice media file according to the image area processing result, to obtain a processed target slice media file.

In an embodiment, a non-transitory computer-readable storage medium, storing computer-readable instructions, which, when executed by processing circuitry of a pre-processing device, causes the pre-processing device to perform a method for processing a multimedia file. The method includes obtaining a source slice media file included in a source multimedia file, and obtaining a slice pre-processing task corresponding to the source slice media file. The method also includes obtaining, by processing circuitry off pre-processing device, an image area processing result corresponding to the source slice media file according to the slice pre-processing task. Finally, the method includes transmitting the image area processing result to a transcoding device, so that the transcoding device processes the source slice media file according to the image area processing result, to obtain a processed target slice media file.

In the embodiments of the disclosure, by means of the method of obtaining, by a transcoding device, a source slice media file in a source multimedia file; obtaining, by the transcoding device, a slice pre-processing result corresponding to the source slice media file, the slice pre-processing result indicating a storage address of an image area processing result corresponding, to the source slice media file, in a pre-processing device; obtaining, by the transcoding device, the image area processing result corresponding to the source slice media file from the storage address; and processing, by the transcoding device, the source slice media file according to the image area processing result, to obtain a processed target slice media file, the image area processing result corresponding to the source slice media file is obtained, and the source slice media file is directly processed according to the image area processing result. The source multimedia file is sliced, to obtain the source slice media file, and a plurality of source slice media files are simultaneously processed by using a distributed transcoding device and a distributed pre-processing device, addressing a problem of relatively low processing efficiency caused by only performing intelligent analysis on the entire source multimedia file in the related art, thereby improving the efficiency of intelligently processing the source multimedia file.

BRIEF DESCRIPTION OF THE DRAWINGS

The accompanying drawings described herein are used for providing further understanding for the disclosure and constitute a part of the disclosure. Exemplary embodiments of the disclosure and descriptions thereof are used for explaining the disclosure and do not constitute an improper limitation to the disclosure. In the accompanying drawings.

DESCRIPTION OF EMBODIMENTS

To make a person skilled in the art better understand solutions of the disclosure, the following describes the technical solutions in embodiments of the disclosure with reference to the accompanying drawings in the embodiments of the disclosure. The described embodiments are merely some rather than all of the embodiments of the disclosure. All other embodiments obtained by a person skilled in the art based on the embodiments of the disclosure shall fall within the scope of the disclosure.

In the specification, claims, and accompanying drawings of the disclosure, the terms "first", "second", and so on are intended to distinguish between similar objects rather than indicating a specific order. The data termed in such a way are interchangeable in proper circumstances, so that the embodiments of the disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
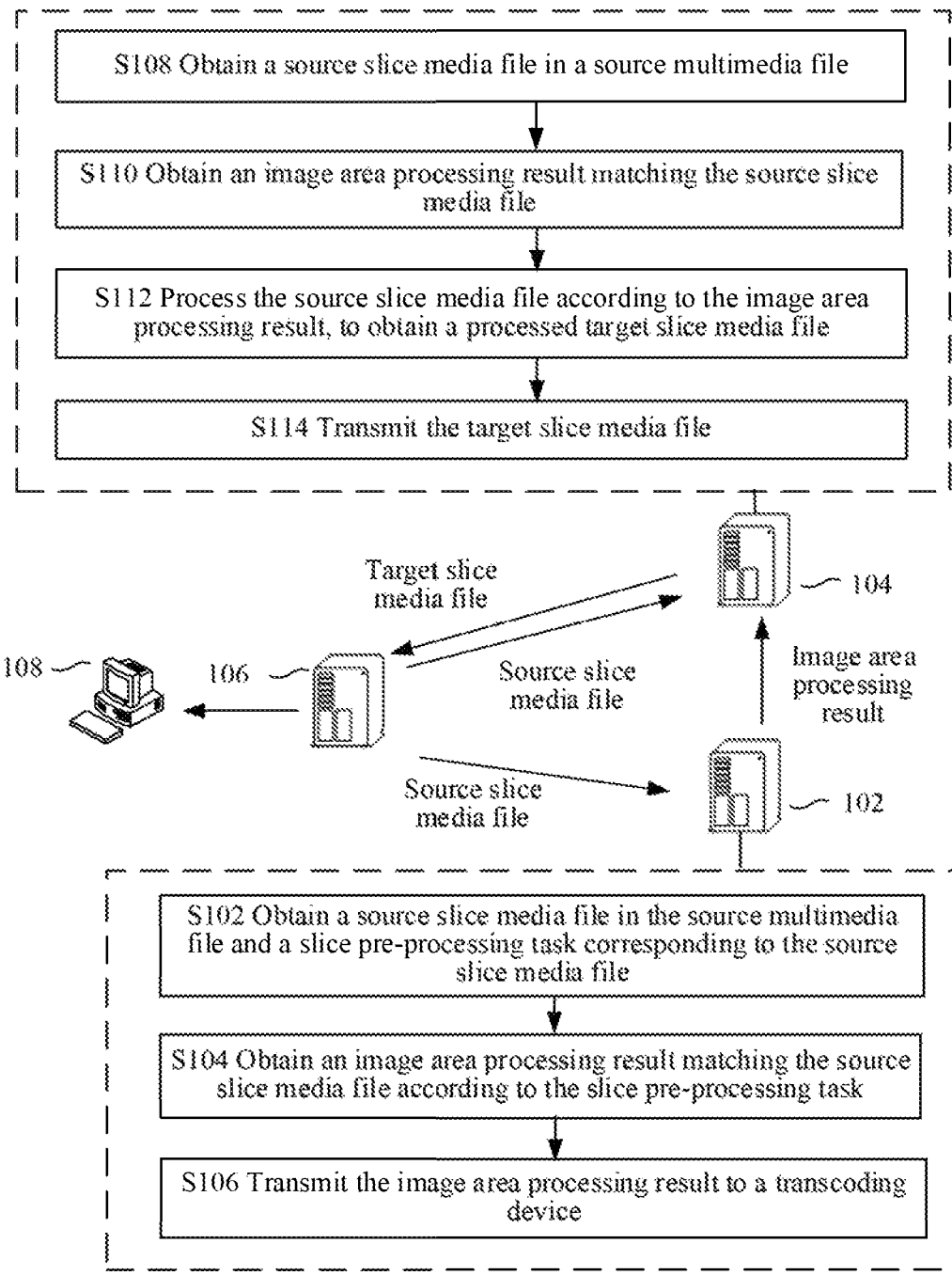
FIG. 1 is a schematic diagram of an application environment of an optional method for processing a multimedia file according to an embodiment of the disclosure.

According to one aspect of the embodiments of the disclosure, a method for processing a multimedia file is provided. Optionally, the method for processing a multimedia file may be applied to, but is not limited to, a system for processing a multimedia file. An application environment of the system is shown in FIG. 1. In the application environment, a server 106 slices a source multimedia file into source slice media files, and transmits the source slice media files to a pre-processing device 102 and a transcoding device 104. The pre-processing device 102 obtains a slice pre-processing task corresponding to a source slice media file through step S102, obtains an image area processing result corresponding to the source slice media file according to the slice pre-processing task through step S104, and transmits the image area processing result to the transcoding device 104 through step S106. The transcoding device 104 obtains the source slice media file through step S108, obtains the image area processing result through step S110, and processes the source slice media file according to the image area processing result through step S112, to obtain a processed target slice media file. The target slice media file is transmitted to the server 106 through step S114. The server 106 combines target slice media files into a target multimedia file, and transmits the target multimedia file to the terminal 108. After receiving the target multimedia file, the terminal 108 plays the target multimedia file.

In this embodiment, a pre-processing device pre-processes a source slice media file, to obtain a slice pre-processing result. The slice pre-processing result indicates a storage address of an image area processing result corresponding to the source slice media file in the pre-processing device. A transcoding device processes each source slice media file according to the image area processing result obtained from the storage address in the pre-processing device, to obtain a processed target slice media file$_{[SY1]}$. Therefore, a source multimedia file is sliced, to obtain a plurality of source slice media files that are simultaneously processed by using a distributed hardware device (such as the transcoding device and the pre-processing device), to overcome a problem of relatively low processing efficiency caused by only performing intelligent analysis on the entire source multimedia file in the related art, thereby improving the efficiency of intelligently processing the source multimedia file.

Optionally, in this embodiment, the system for processing a multimedia file may include, but is not limited to, a hardware device such as a transcoding device, a pre-processing device, or a control device. The hardware device may include, but is not limited to, a hardware device capable of processing data. A network may include, but is not limited to, at least one of the following: a wide area network, a metropolitan area network, and a local area network. The foregoing is merely an example, and this is not limited in this embodiment.

Figure 2:
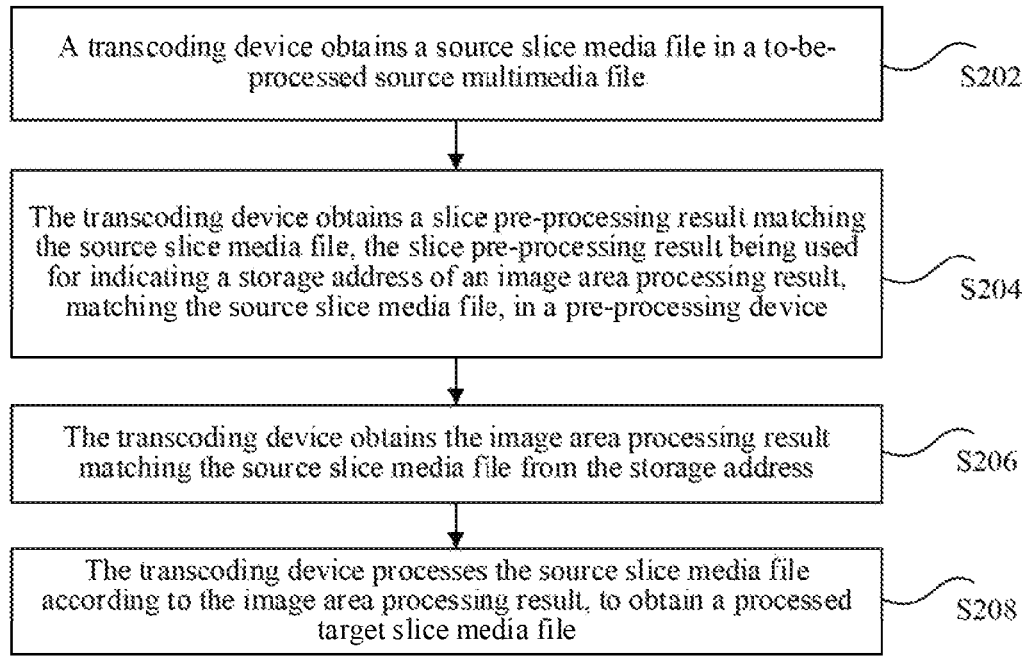
FIG. 2 is a schematic flowchart of an optional method for processing a multimedia file according to an embodiment of the disclosure.

Optionally, in this embodiment as shown in FIG. 2, the method may include the following steps. In step S202, a source slice media file included in a source multimedia file is obtained by a transcoding device.

In step S204, a slice pre-processing result corresponding to the source slice media file is obtained by the transcoding device, the slice pre-processing result being used for indicating a storage address of an image area processing result corresponding to the source slice media file in a pre-processing device. The pre-processing device is used for obtaining the image area processing result.

In step S206, the image area processing result corresponding to the source slice media file is obtained by the transcoding device from the storage address.

In step S208, the source slice media file is processed by the transcoding device according to the image area processing result, to obtain a processed target slice media file.

Optionally, the method for processing a multimedia file may be applied to, but is not limited to, a scenario in which a multimedia file is effectively transcoded and transmitted. A control device transmits a source slice media file included in a source multimedia file to a transcoding device and a pre-processing device. The pre-processing device pre-processes the source slice media file, to obtain a slice pre-processing result. The slice pre-processing result indicates a storage address of an image area processing result corresponding to the source slice media file, in the pre-processing device. The transcoding device processes each source slice media file according to the image area processing result obtained from the storage address in the pre-processing device, to obtain a processed target slice media file. Therefore, the source multimedia file is sliced, to obtain a plurality of source slice media files that are simultaneously processed by using a distributed hardware device (such as the transcoding device and the pre-processing device), to overcome a problem of relatively low processing efficiency caused by only performing intelligent analysis on the entire source multimedia file in the related art, thereby improving the efficiency of intelligently processing the source multimedia, file.

Optionally, the source slice media file included in the source multimedia file may be obtained through the following step: slicing, by a slice server, the source multimedia file into a plurality of source slice media files.

The slice server is configured to: slice the source multimedia file into source slice media files, and transmit the source slice media files to the pre-processing device and the transcoding device.

Optionally, the slicing may be, but is not limited to, slicing the source multimedia file according to predetermined duration. For example, one source multimedia file that is 10 minutes and 50 seconds long is sliced every two minutes from 00:00 of the source multimedia file, and the source multimedia file is sliced into 5 source slice media files that are two minutes long an a source slice media file that is 50 seconds long. Alternatively, the source multimedia file that is 10 minutes and 50 seconds long is equally sliced into 5 source slice media files according to an average division method, and each source slice media file is 2 minutes and 10 seconds long.

The slicing the source multimedia file according to the predetermined duration or by using the average division method is merely an example, and a specific method for slicing the source multimedia file and duration of the source slice media files are not limited in this embodiment.

Optionally, before the transcoding device obtains the source slice media file included in the source multimedia file, the control device may further transmit a slice pre-processing task corresponding to the source slice media file to the pre-processing device. The pre-processing device performs key area recognition on at least one frame image included in the source slice media file according to the slice pre-processing task, and stores the image area processing result obtained through the key area recognition.

Optionally, before transmitting the slice pre-processing task to the pre-processing device, the control device may further determine the pre-processing device corresponding to the source slice media file from a pre-processing device cluster.

Optionally, before the determining the pre-processing device corresponding to the source slice media file from a pre-processing device cluster, the method may further include: setting, by the control device, a plurality of pre-processing devices to form the pre-processing device cluster, where the plurality of pre-processing devices are in a parallel relationship in the pre-processing device cluster.

Optionally, before the determining the preprocessing device corresponding to the source slice media file from a pre-processing device cluster, the method may further include: determining, by the control device according to a file type of the source slice media file, the pre-processing device corresponding to the file type.

For example, file types of the source slice media file may be a captioned type and a caption-less type. A pre-processing device processing a caption is selected to process a captioned source slice media file, and a pre-processing device processing is selected to process a caption-less source slice media file.

The method for determining the pre-processing device corresponding to the source slice media file from the pre-processing device cluster is merely an optional example, and does not constitute a limitation to the disclosure.

Optionally, the transcoding device processing the source slice media file according to the image area processing result, to obtain a processed target slice media file may include: obtaining, by the transcoding device, a key area in at least one frame image included in the source slice media file according to the image area processing result; and performing, by the transcoding device, a first operation on the key area, and performing a second operation on areas other than the key area.

Optionally, the transcoding device processing the source slice media file according to the image area processing result, to obtain a processed target slice media lite may include: obtaining, by the transcoding device, a key time period included in the source slice media file according to the image area processing result; and performing a first operation on the key time period, and performing a second operation on a time period other than the key time period.

Optionally, the key time period may be one or more segments in the source slice media file, the first operation may be increasing a bit rate, and the second operation may be reducing a bit rate. For example, the image area processing result indicates that the $3^{rd}$ second to the $7^{th}$ second and the $11^{th}$ second to the $14^{th}$ second of the source slice media file are key time periods, and other time periods are non-key time periods. Bit rates of files from the $3^{rd}$ second to the $7^{th}$ second and the $11^{th}$ second to the $14^{th}$ second of the source slice media file are increased, and bit rates of other non-key time periods are reduced.

The first operation corresponding to increasing a bit rate and the second operation corresponding to reducing a bit rate is merely an optional operation. This is not specifically limited in this embodiment.

In this embodiment of the disclosure, by means of the method of obtaining, by a transcoding device, a source slice media file included in a source multimedia file and a slice pre-processing result corresponding to the source slice media file; obtaining an image area processing result corresponding to the source slice media file according to a storage address indicated in the slice pre-processing, result; and processing the source slice media file according to the image area processing result, to obtain one image area processing result for each source slice media file, each source slice media file in the source multimedia file may be processed according to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

In an optional implementation, before the transcoding device obtains the source slice media file included in the source multimedia file, the method further includes the following steps.

In a first step, a slice pre-processing task corresponding to the source slice media file is obtained by a control device.

In a second step, the slice pre-processing task corresponding to the source slice media file is transmitted by the control device to the pre-processing device, so that the pre-processing device performs key area recognition on at least one frame image included in the source slice media file according to the slice pre-processing task, and stores the image area processing result obtained through the key area recognition.

Optionally, the slice pre-processing task may be analyzing an image in each frame of the source slice media file, to obtain a key area of the image in each frame, and storing the key area in the image area processing result.

Figure 3:
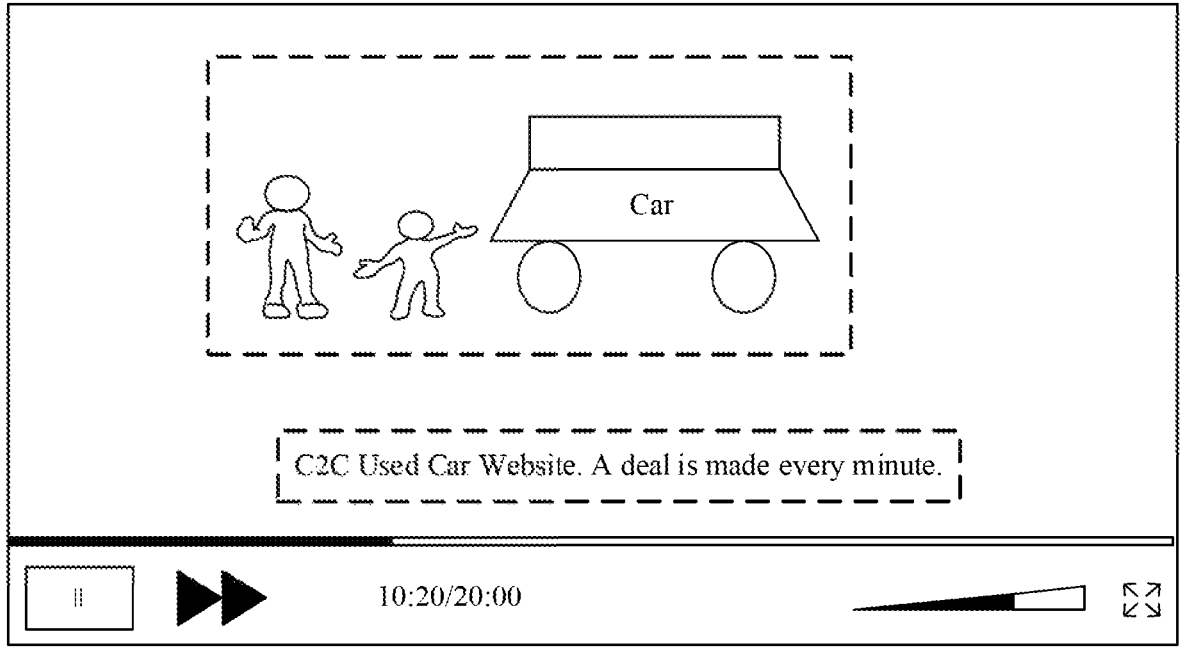
FIG. 3 is a schematic diagram of an optional method for processing a multimedia file according to an embodiment of the disclosure.

For example, FIG. 3 is used for description. FIG. 3 shows one frame in one source slice media file. As shown in FIG. 3, the source slice media file is 20 minutes long. After a source slice, media file and a slice pre-processing task are received, each frame in the source slice media file is analyzed according to the slice pre-processing task, to obtain a key area in each frame. In FIG. 3, the key area is indicated by using a dashed-line box. The key area obtained through recognition in each frame is stored in an image area processing result.

For a basis of determining the key area, no specific limitation is imposed in this embodiment. For example, the key area may be determined through a color or a shape of an image, a specific image, or the like in the source slice media file. Alternatively, an area with a caption is determined as the key area.

In this embodiment, before a source slice media file included in a source multimedia file is obtained, a slice pre-processing task corresponding to the source slice media file is obtained, and key area recognition is performed on at least one frame image in the source slice media file by using a pre-processing device. Therefore, in a process of processing the source slice media file, a policy for processing the source slice media file is determined, and the source slice media file is flexibly processed.

In an optional implementation, before the transmitting a slice pre-processing task corresponding to the source slice media file to the pre-processing device, the method further includes the following step.

In the step, the pre-processing device corresponding to the source slice media file is determined by a control device from a pre-processing device cluster, a ratio of a quantity of source slice media files in the source multimedia file to a quantity of pre-processing devices in the pre-processing device cluster being N:M, N being a natural number greater than 1, and M being a natural number greater than 1.

Optionally, a ratio of a quantity of source slice media files to a quantity of pre-processing devices in the pre-processing device cluster being N:M may be that one source slice media file corresponds to one pre-processing device, or a plurality of source slice media files correspond to one pre-processing device.

Optionally, the determining the pre-processing device corresponding to the source slice media file from a pre-processing device cluster may be: equally allocating N source slice media files to M pre-processing devices.

Figure 4:
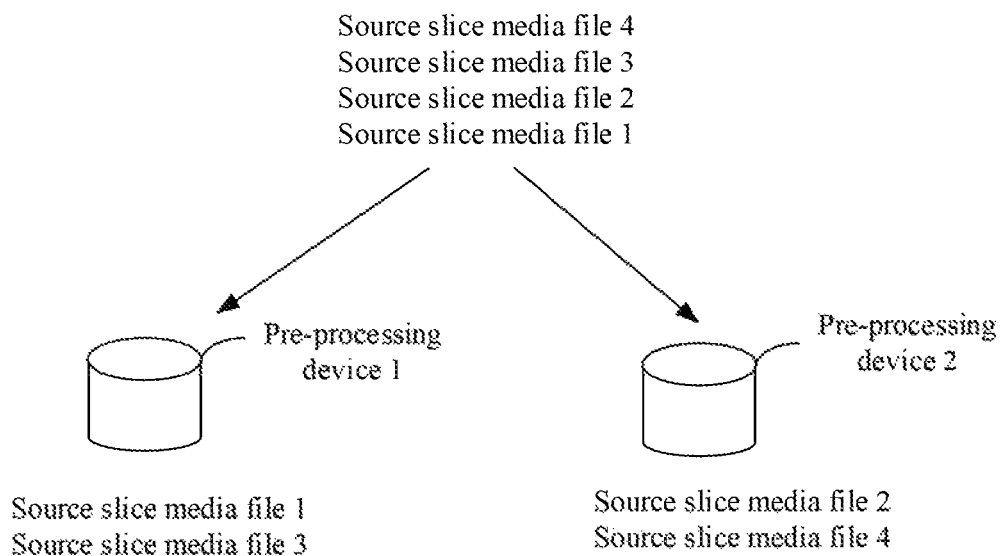
FIG. 4 is a schematic diagram of another optional method for processing a multimedia file according to an embodiment of the disclosure.

For example, FIG. 4 is used for description, in FIG. 4, 4 source slice media files are displayed. When allocation is performed on the 4 source slice media files, the 4 source slice media files are allocated to a pre-processing device 1 and a pre-processing device 2 according to an order. That is, a source slice media file 1 is allocated to the pre-processing device 1, and a source slice media file 2 is allocated to the pre-processing, device 2. A source slice media file 3 is allocated to the pre-processing device 1, and a source slice media file 4 is allocated to the pre-processing device 2. If there is a source slice media file 5, the source slice media file 5 is also allocated to the wire-processing device $1_{[SY2]}$.

The quantity of the source slice media files and the quantity of the pre-processing devices are not specifically limited in the disclosure.

Optionally, the determining the pre-processing device corresponding to the source slice media file from a pre-processing device cluster may be: in a case that each source slice media file is allocated, allocating the source slice media file to a current pre-processing device with the fewest source slice media files.

Figure 5:
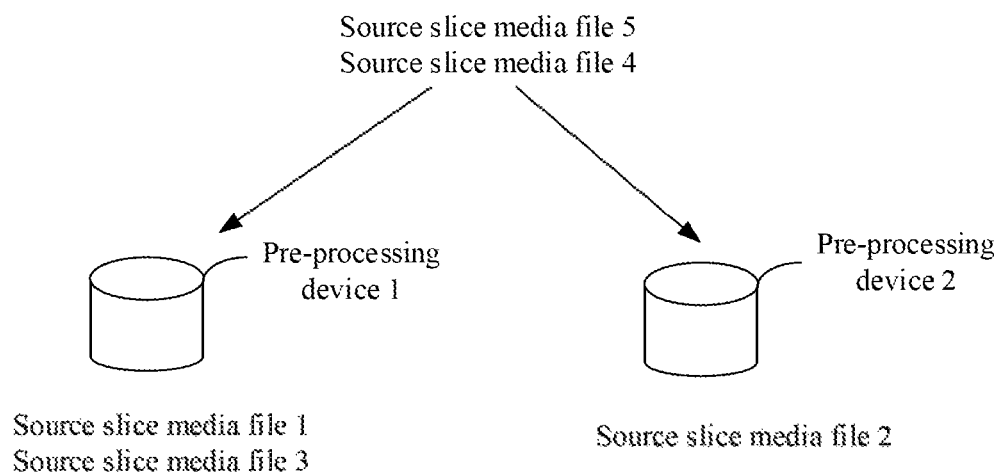
FIG. 5 is a schematic diagram of still another optional method for processing a multimedia file according to an embodiment of the disclosure.

For example, FIG. 5 is used for description. A pre-processing device 1 includes source slice media files 1 and 3, and a pre-processing device 2 includes a source slice media file 2. When a source slice media file 4 is to be allocated, the source slice media file 4 is allocated to the pre-processing device 2 with fewer source slice media files. When a source slice media file 5 is allocated, because a quantity of source slice media files in the pre-processing device 1 is the same as that in the pre-processing device 2, a sequential allocation method or random allocation method may be used.

The quantity of the source slice media files and the quantity of the pre-processing devices are not specifically limited in the disclosure. The method for allocating a source slice media file is merely an optional example. This is not specifically limited in this embodiment.

In this embodiment of the disclosure, a pre-processing device corresponding to a source slice media file is determined from a pre-processing device cluster, thereby ensuring that each source slice media file is processed by using one pre-processing device. In addition, because there are a plurality of pre-processing devices, the efficiency of processing the source slice media file is improved.

In an optional implementation, the transcoding device processing the source slice media file according to the image area processing result, to obtain a processed target slice media file includes the following steps.

In a first step, a key area in at least one frame image included in the source slice media file is obtained by the transcoding device according to the image area processing result.

In a second step, a first operation on the key area is performed by the transcoding device, and a second operation is performed by the transcoding device on areas other than the key area in the at least one frame image included in the source slice media file, the first operation and the second operation being different operations.

Optionally, the operations may be changing a bit rate of the key area in the source slice media file, rendering the key area, or the like. For example, the first operation is rendering an image of the key area by using a first parameter, and the second operation is rendering the image of the key area by using a second parameter. The first parameter is different from the second parameter.

Optionally, the first parameter and the second parameter may include parameters such as a color and saturation of an image.

Optionally, each frame in the source slice media file may include a same key area or different key areas.

Figure 6:
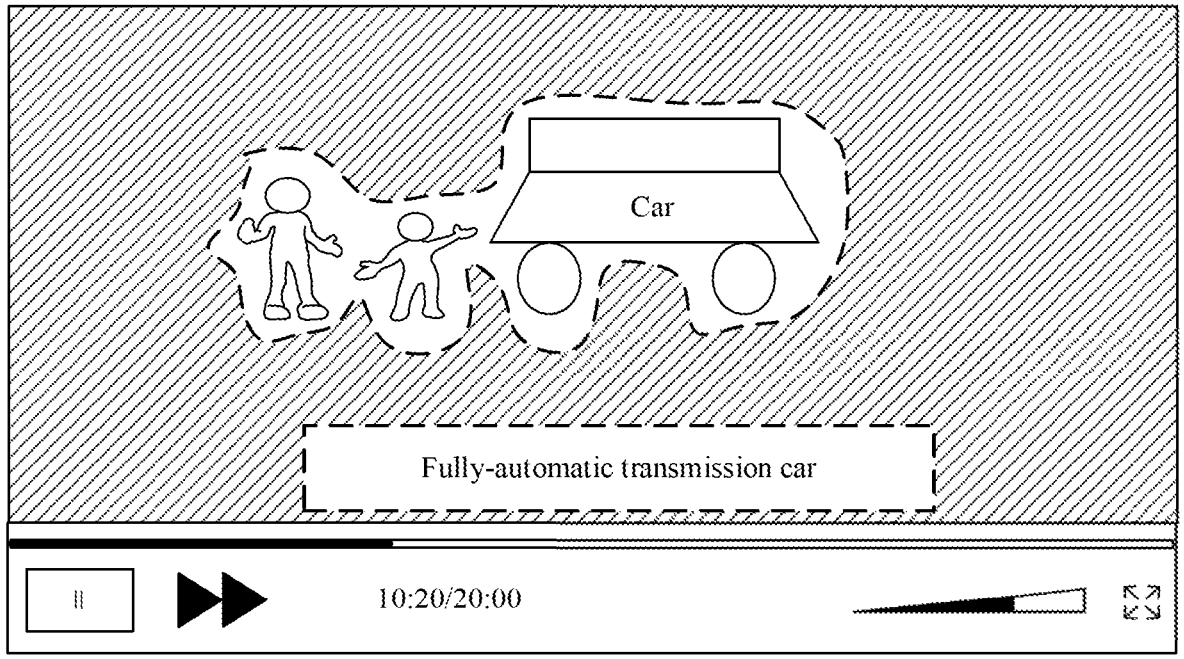
FIG. 6 is a schematic diagram of still another optional method for processing a multimedia file according to an embodiment of the disclosure.

Specifically, FIG. 6 is used for description. As shown in FIG. 6, in one frame of one source slice media file, locations at which people, a car, and the like are displayed are determined as a key area, an area in which a caption is displayed is determined as a key area, and the key areas are enclosed by dashed lines. Areas other than the areas enclosed by the dashed lines are determined as other areas and are represented by shade. Therefore, the first operation may be performed on the key areas, and the second operation may be performed on the other areas.

For a method for determining a key area, no specific limitation is imposed in this embodiment. For example, the method may be: determining the key area through a color or a shape of an image, a specific image, or the like in the source slice media file.

In this embodiment a key area, in a frame image included in a source slice media file is obtained by a transcoding device according to an image area processing result, a first operation is performed on the key area, and a second operation is performed on other areas, so as to perform different operations on different areas in the source slice media file, thereby improving to flexibility of processing the source slice media file.

In an optional implementation, the transcoding device performing a first operation on the key area, and performing a second operation on areas other than the key area in the frame image included in the source slice media file includes the following steps.

In a first step S1, an encoding processing operation is performed by the transcoding device on the key area according to a first bit rate.

In a second step S2, the encoding processing operation is performed by the transcoding device on the areas other than the key area in the frame image according to a second bit rate.

The first bit rate is greater than the second bit rate.

Optionally, the first bit rate may be an ultra-high definition bit rate, and the second bit rate may be a high definition bit rate. For example, FIG. 6 is still used for description. In FIG. 6, a key area and a non-key area have been determined. In this case, a bit rate in the key area is adjusted to an ultra-high definition bit rate, and bit rates of other areas are adjusted to high definition bit rates, thereby making a person, a car, and a caption in the key area clearer. In addition, because the other areas do not have ultra-high definition bit rates, the size of the source slice media file is reduced.

In this embodiment, a transcoding device performs an encoding processing operation on a key area according to a first bit rate, and performs the encoding processing operation on areas other than the key area in a frame image according to a second bit rate, so as to perform different operations on different areas in a source slice media file, so that different areas have different display bit rates, thereby improving the flexibility of processing the source slice media file.

In an optional implementation, after processing the source slice media file according to the image area processing result, to obtain a processed target slice media file, the method further includes the following steps.

In a first step target slice media files respectively corresponding to source slice media files included in the source multimedia file are combined by the transcoding device to obtain a target multimedia file corresponding to the source multimedia.

In a second step, the target multimedia file is transmitted by the transcoding device to a playing client for playing.

Optionally, combining target slice media files may include determining an order of the target slice media files according to a start moment of each target slice media file, combining, a plurality of target slice media files into one complete target multimedia file according to the order of the target slice media files, and transmitting the target multimedia file to a playing client for playing.

For example, there are three target slice media files numbered 1, 2, and 3. Start moments of the three target slice media files are respectively 00:00, 04:00, and 02:00. Therefore, a correct order of the three target slice media files is 1, 3, and 2. According to the foregoing order, the three target slice media files are combined into one target multimedia file, and the target multimedia file is transmitted to a playing client for playing.

In this embodiment, a transcoding device combines target slice media files respectively corresponding to source slice media files included in a source multimedia file, to obtain a target multimedia file corresponding to the source multimedia file, and transmits the target multimedia file to a playing client for playing, thereby ensuring that a complete target multimedia file may be obtained after a process of processing the source slice media file, and improving the processing accuracy of the source slice media file.

Figure 7:
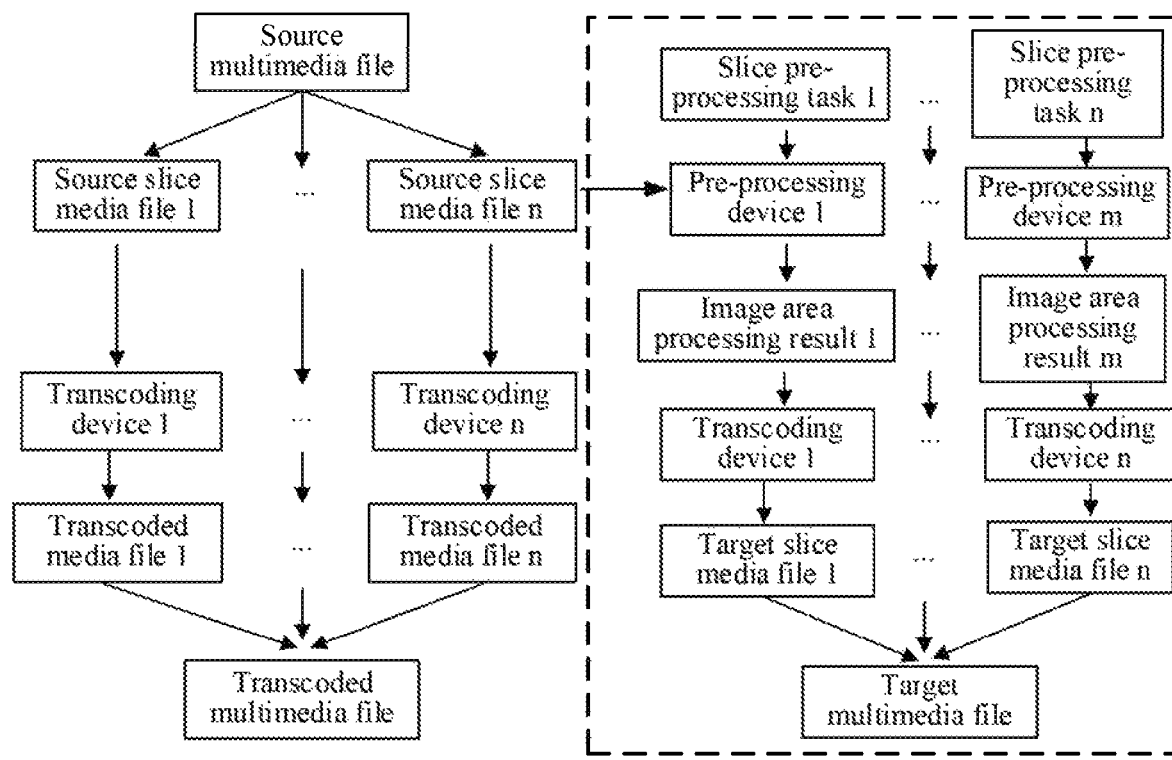
FIG. 7 is a schematic diagram of still another optional method for processing a multimedia file according to an embodiment of the disclosure.

The method for processing a multimedia file is entirely described below with reference to FIG. 7. As shown in FIG. 7, a portion enclosed by a dashed-line box is not included in related art systems shown outside the dashed-line box. When a source multimedia file is obtained, a source slice media file 1 to a source slice media file n are obtained by partitioning to the source multimedia file, where n is a natural number greater than 1. The source slice media files 1 to n are then transmitted to transcoding devices 1 to n. The transcoding devices 1 to n transcode the source slice media files 1 to n, to obtain transcoded media files 1 to n, and combine the transcoded media files 1 to n into a transcoded multimedia file. However, by means of the method, only the source multimedia file is transcoded. In the disclosure, after the source slice media files 1 to n are obtained, steps in the dashed-line box are used to transmit the obtained source slice media files 1 to a to pre-processing devices 1 to m, where in is a natural number greater than 1. The pre-processing devices 1 to m receive one or more oldie slice pre-processing tasks 1 to n allocated to each source slice media file, and analyze the source slice media files 1 to n according to the received slice pre-processing tasks 1 to n, to obtain an image area processing result of each source slice media file. After the image area processing result of each source slice media file is obtained, image area processing results 1 to n are transmitted to the transcoding devices 1 to n. The transcoding devices 1 to n transcended the source slice media files 1 to n according to the image area processing results to n, to obtain target slice media files 1 to n, and combine the target slice media files, to obtain a target multimedia file.

There may be not a transcoding devices. When there are not n transcoding devices, the following two cases exist:

In a case that a quantity of the source slice media files is less than a quantity of the transcoding devices, the source slice media files are processed directly by using the transcoding devices. In a case that a quantity of the source slice media files is greater than a quantity of the transcoding devices, excess source slice media files wait in a queue to be processed.

By means of the foregoing steps, one image area processing result is obtained for each source slice media file, so that each source slice media file in a source multimedia file may be processed according to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

For simple descriptions, the foregoing method embodiments are stated as a series of action combinations. However, the disclosure is not limited to the sequence of the described actions because, according to the disclosure, some operations may be performed in a different sequence or may be simultaneously performed. Secondarily, the embodiments described in the specification all belong to optional embodiments and the related actions and modules are not necessary for the disclosure.

According to the descriptions in the foregoing implementations, the method according to the foregoing embodiments may be implemented by relying on software and a corresponding hardware platform or by using hardware, but in many cases the former is a better implementation. Based on such an understanding, the technical solutions of the disclosure may be implemented in a form of a software product. The computer software product is stored in a non-transitory computer-readable storage medium (such as a ROM/RAM, a magnetic disk, or an optical disc) and includes several instructions for instructing a computing device (which may be a mobile phone, a computer, a server, a network device, or the like) to perform the methods described in the embodiments of the disclosure.

According to another aspect of the embodiments of the disclosure, a method for processing a multimedia file is further provided. Optionally, the method for processing a multimedia file may be applied to, but is not limited to, an application environment shown in FIG. 1. The type of a subject performing actions is not specifically limited in this embodiment.

Figure 8:
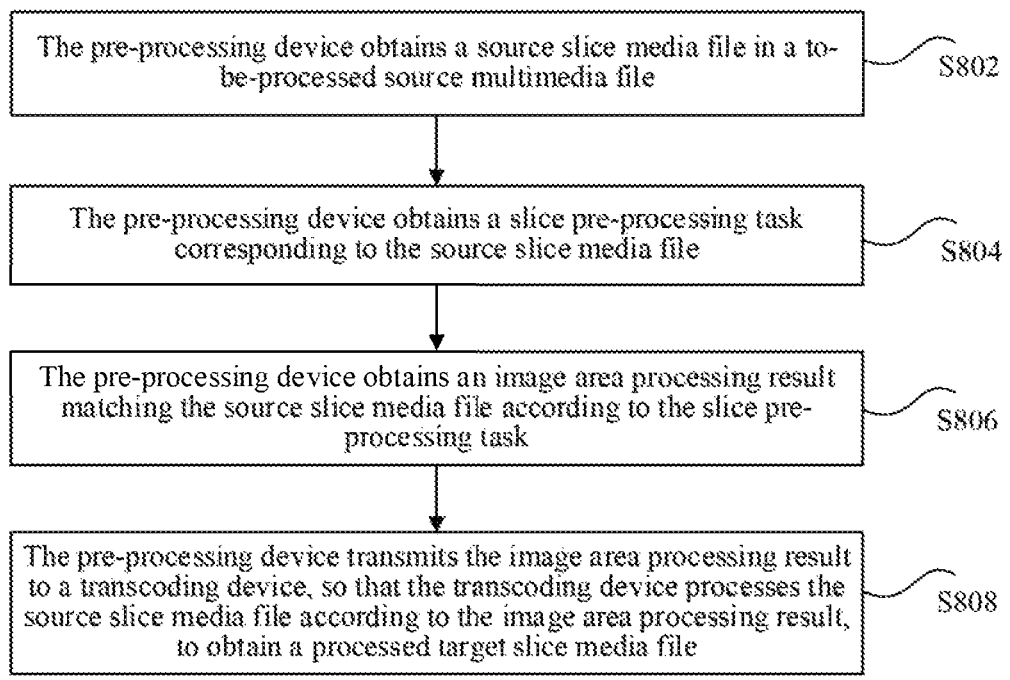
FIG. 8 is a schematic diagram of another optional method for processing a multimedia file according to an embodiment of the disclosure.

Optionally, as shown in FIG. 8, the method is applied to a pre-processing device and the method includes the following steps.

To step S802, a source slice media file included in a source multimedia file is obtained by the pre-processing device.

In step S804, a slice pre-processing, task corresponding to the source slice media file is obtained by the pre-processing device.

In step S806, an image area processing result corresponding to the source media file is obtained by the pre-processing device according to the slice pre-processing task.

In step S808, the image area processing result is transmitted by the pre-processing device to a transcoding device, so that the transcoding device processes the source slice media file according to the image area processing result, to obtain a processed target slice media file.

Optionally, the method for processing a multimedia file may be applied to, but is not limited to, a scenario of processing a video file. A pre-processing device obtains a source slice media file in a source multimedia file, and a slice pre-processing task corresponding to the source slice media file; obtains an image area processing result corresponding to the source slice media file according to the slice pre-processing task; and transmits the image area processing result to a transcoding device, so that the transcoding device processes the source slice media file according to the image area processing result, to obtain a processed target slice media file.

Optionally, the source slice media file included in the source multimedia file may be obtained through the following step: slicing, by a slice server, the source multimedia file into a plurality of source slice media files according to a slice rule.

The slice server is configured to: slice the source multimedia file into source slice media, files, and transmit the source slice media files to the pre-processings device and the transcoding device.

Optionally, the slice rule may be slicing the source multimedia file according to predetermined duration. For example, one source multimedia file that is 10 minutes and 50 seconds long may be sliced every two minutes from 00:00 of the source multimedia file, and the source multimedia file is sliced into 5 slice media files that are two minutes long and a slice media file that is 50 seconds long. Alternatively, the source multimedia file that is 10 minutes and 50 seconds long may be equally sliced into 5 slice media files according to an average division method, and each slice media file is 2 minutes and 10 seconds long.

The slicing the source multimedia file according to the predetermined duration or by using the average division method is merely an example, and a specific method for slicing the source multimedia file and duration of the slice media file are not limited in this embodiment.

Optionally, the obtaining an image area processing result corresponding to the source slice media file according to the slice pre-processing task includes: performing, by the pre-processing device, key area recognition on at least one frame image included in the source slice media, file according to the slice pre-processing task, and storing the image area processing result obtained through recognition.

Optionally, key areas in the frames may be the same or may be different.

Optionally, the transmitting the image area processing result to a transcoding device includes: obtaining, by the pre-processing device, an obtaining request transmitted by the transcoding device, the obtaining request carrying a storage address used for indicating the image area processing result; and transmitting, by the pre-processing device, the image area processing result in the storage address to the transcoding, device.

Optionally, the transmitting the image area processing result to a transcoding device includes: after[SY3] the pre-processing device performs the key area recognition on the source slice media file according to the slice pre-processing task, and obtains the image area processing result, directly transmitting the image area processing result to the transcoding device.

Optionally, before the obtaining a source slice media file included in a source multimedia file, the method further includes: determining, by a control device, the pre-processing device corresponding to the source slice media file from a pre-processing device cluster, a ratio of a quantity of source slice media files in the source multimedia file to a quantity of pre-processing devices in the pre-processing device cluster being N:M, N being a natural number greater than 1, and M being a natural number greater than 1.

Optionally, a ratio of a quantity of source slice media files to a quantity of pre-processing devices in the pre-processing device cluster being N:M may be that one source slice media file corresponds to one pre-processing device, or a plurality of source slice media files correspond to one pre-processing device.

In this embodiment of the disclosure, a pre-processing device obtains a source slice media file included in a source multimedia file and a slice pre-processing task corresponding to the source slice, media file, and obtains an image area processing result corresponding to the source slice media file according to the slice pre-processing task. A transcoding device processes the source slice media file$_{[SY4]}$, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

In an optional implementation, the pre-processing device obtaining an image area processing result corresponding to the source slice media file according to the slice pre-processing task includes the following steps.

In a first step, key area recognition is performed by the pre-processing device on at least one frame image included in the source slice media file according to the slice pre-processing task.

In a second step, the image area processing result obtained, through the key area recognition is stored by the pre-processing device.

Optionally, each frame in the source slice media file may include a same key area or different key areas.

For example, FIG. 6 is used for description. As shown in FIG. 6, in a case that the source slice media, file is recognized according to the slice pre-processing task, it is recognized that an image in FIG. 6 includes two person images, one car image, and a corresponding caption. Therefore, locations at which the person images, the car image, and the caption are located are determined as key areas, and a recognition result is stored in the image area processing result.

In this embodiment of the disclosure, a pre-processing device recognizes and stores a key area in a source slice media file, to obtain an image area processing result, so as to perform different operations on different, areas in the source slice media file, thereby improving the flexibility of processing the source slice media file.

In an optional implementation, the pre-processing device transmitting the image area processing result to a transcoding device includes the following steps.

In a first step, an obtaining request transmitted by the transcoding device is obtained by the pre-processing, device, the obtaining request carrying a storage address used for indicating the image area processing result.

In a second step, the image area processing result is transmitted by the pre-processing device in the storage address to the transcoding device.

For example, after obtaining the image area processing result, the pre-processing device stores the image area processing result, and transmits a storage address storing the image area processing result to a server. The transcoding device obtains the storage address from the server, and transmits a request to the pre-processing device according to the storage address, to request to obtain the image area processing result storing in the pre-processing device.

In this embodiment, a pre-processing device obtains an obtaining request transmitted by a transcoding device, and obtains an image area processing result according to a storage address of the image area processing result in the obtaining request, thereby storing the storage address of the image area processing result in a server, and reducing the load of the pre-processing device.

In an optional implementation, before the obtaining a source slice media file included in a source multimedia file, the method further includes the following step.

In the step, the pre-processing device corresponding to the source slice media file is determined by a control device from a pre-processing device cluster, a ratio of a quantity of source slice media files in the source multimedia file to a quantity of pre-processing devices in the pre-processing device cluster being N:M, N being a natural number greater than 1, and M being a natural number greater than 1.

Optionally, the determining the pre-processing device corresponding to the source slice media file from a pre-processing device cluster may be: equally allocating N source slice media files to M pre-processing devices.

For example, FIG. 4 is used for description. In FIG. 4, 4 source slice media files are displayed. When allocation is performed on the 4 source slice media files, the 4 source slice media files are allocated to a pre-processing device 1 and a pre-processing device 2 according to an order. That is, a source slice media file 1 is allocated to the pre-processing device 1, and a source slice media file 2 is allocated to the pre-processing device 2. A source slice media file 3 is allocated to the pre-processing device 1, and a source slice media file 4 is allocated to the pre-processing device 2. If there is a source slice media file 5, the source slice media file 5 is also allocated to the pre-processing device 1.

The quantity of the source slice media files and the quantity of the pre-processing devices are not specifically limited in the disclosure.

Optionally, the determining the pre-processing device corresponding to the source slice media file from a pre-processing device cluster may be: in a case that each source slice media file is allocated, allocating the source slice media file to a current pre-processing device with the fewest source slice media files.

For example, FIG. 5 is used for description. A pre-processing device 1 includes source slice media files 1 and 3, and a pre-processing device 2 includes a source slice media file 2. When a source slice media file 4 is to be allocated, the source slice media file 4 is allocated to the pre-processing device 2 with fewer source slice media files. When a source slice media file 5 is allocated, because a quantity of source slice media Ides in the pre-processing device 1 is the same as that in the pre-processing device 2, a sequential allocation method or random allocation method may be used.

The quantity of the source slice media files and the quantity of the pre-processing devices are not specifically limited in the disclosure. The method for allocating a source slice media file is merely an optional example. This is not specifically limited in this embodiment.

In this embodiment of the disclosure, a control device determines a pre-processing device corresponding to a source slice-media file from a pre-processing device cluster, thereby ensuring that each source slice media file is processed by using one pre-processing device. In addition, because there are a plurality of pre-processing devices, the efficiency of processing the source slice, media file is improved.

The method for processing a multimedia file is described below with reference to FIG. 7. As shown in FIG. 7, a portion enclosed by a dashed-line box is not included in related art systems shown outside the dashed-line box. When a source multimedia file is obtained, a source slice media file 1 to a source slice media file n are obtained according to the source multimedia file, where n is a natural number greater than 1. The source slice media files 1 to n are then transmitted to transcoding devices 1 to n. The transcoding devices 1 to n transcode the source slice media files 1 to n, to obtain transcoded media files 1 to n, and combine the transcoded media files 1 to n into a transcoded multimedia file. However, by means of the method, only the source multimedia file is transcoded. In the disclosure, after the source slice media files 1 to n are obtained, steps in the dashed-line box are used to transmit the obtained source slice media files 1 to n to pre-processing devices 1 to m, where m is a natural number greater than 1. The pre-processing devices 1 to m receive slice pre-processing tasks 1 to n allocated to each source slice media file, and analyze the source slice media files 1 to n according to the received slice pre-processing tasks 1 to n, to obtain an image area processing result of each source slice media file. After the image area processing result of each source slice media file is obtained, image area processing results 1 to n are transmitted to the transcoding devices 1 to n. The transcoding devices 1 to n transcode the source slice, media files 1 to n according to the image area processing results 1 to n, to obtain target slice media files 1 to n, and combine the target slice media files, to obtain a target multimedia file.

There may be not n transcoding devices. When there are not n transcoding devices, the following two cases exist:

In a case that a quantity of the source slice media files is less than a quantity of the transcoding devices, the source slice media files are processed directly by using the transcoding devices. In a case that a quantity of the source slice media files is greater than a quantity of the transcoding devices, excess source slice media files wait in a queue to be processed.

By means of the foregoing steps, one image area processing result is obtained for each source slice media file, so that each source slice media file in a source multimedia file may be processed according to the image area processing result, to obtain a target slice media file, so as to intelligently analyze and process each source slice media file in the source multimedia file. Therefore, a problem that only the entire source multimedia file can be intelligently analyzed in the related an is resolved, and the processing efficiency of processing the source multimedia file is improved.

Figure 9:
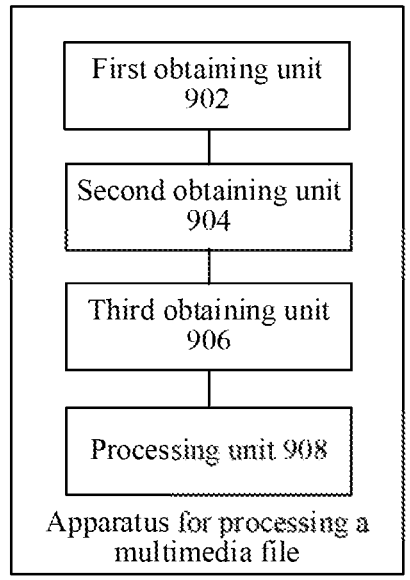
FIG. 9 is a schematic structural diagram of an optional apparatus for processing a multimedia file according to an embodiment of the disclosure.

According to still another aspect of the embodiments of the disclosure, an apparatus for processing a multimedia file implementing the foregoing method for processing a multimedia file is further provided. The apparatus for processing a multimedia file may be a transcoding device or may be disposed in the transcoding device. As shown in FIG. 9, the apparatus for processing a multimedia file includes a first obtaining unit 902, configured to obtain a source slice media file in a source multimedia file. The apparatus further includes a second obtaining unit 904, configured to obtain a slice pre-processing result corresponding to the source slice media file, the slice pre-processing result indicating a storage address of an image area processing result corresponding to the source slice media file, in a pre-processing device. The apparatus also includes a third obtaining unit 906, configured to obtain the image area processing result corresponding to the source slice media file from the storage address, and a processing unit 908, configured to process the source slice media file according to the image area processing result, to obtain a processed target slice media file.

Optionally, the apparatus for processing a multimedia file may be applied to, but is not limited to, a scenario of processing, a video file. The transcoding device obtains a source slice media file included in a source multimedia file, and processes each source slice media file according to an image area processing result, to obtain a processed target slice media file, so as to perform deep learning and processing on each source slice media file. Therefore, a problem that only the entire source multimedia file can be intelligently analyzed in the related art is resolved, and the efficiency of performing intelligent analysis on the source multimedia file and the efficiency of processing the source multimedia file are improved.

Optionally, the source slice media file in the source multimedia file may be obtained through the fallowing step: slicing, by a slice server, the source multimedia file into a plurality of source slice media files according to a slice rule.

The slice server is configured to: slice the source multimedia file into source slice media files, and transmit the source slice media files to the pre-processing device and the transcoding device.

Optionally, the slice rule may be slicing the source multimedia file according to predetermined duration. For example, one source multimedia file that is 10 minutes and 50 seconds long may be sliced every two minutes from 00:00 of the source multimedia file, and the source multimedia file is sliced into 5 slice media files that are two minutes long and a slice media file that is 50 seconds long. Alternatively, the source multimedia file that is 10 minutes and 50 seconds long may be equally sliced into 5 slice media files according to an average division method, and each slice media file is 2 minutes and 10 seconds long.

The slicing the source multimedia file according to the predetermined duration or by using the average division method is merely an example, and a specific method for slicing the source multimedia file and duration of the slice media file are not limited in this embodiment.

Optionally, before the obtaining a source slice media file included in a source multimedia file, a control device may thither obtain a slice pre-processing task corresponding to the source slice media-file, and transmit the source slice media file and the slice pre-processing task to a pre-processing device. The pre-processing device performs key area recognition on a frame image included in the source slice media file according to the slice pre-processing task, and stores the image area processing result obtained through recognition.

Optionally, before transmitting the source slice media file and the slice pre-processing task to a pre-processing device, the control device may further determine the pre-processing device corresponding to the source slice media file from a pre-processing device cluster.

Optionally, before the determining the pre-processing device corresponding to the source slice media file from a pre-processing device cluster, the method may further include: setting, by the control device, a plurality of pre-processing devices to form the pre-processing device cluster, where the plurality of pre-processing devices are in a parallel relationship in the pre-processing device cluster.

Optionally, before the determining the pre-processing device corresponding to the source slice media file from a pre-processing device cluster, the method may further include: determining, by the control device according to a file type of the source slice media file, the pre-processing device corresponding to the file type.

For example, the file type of the source slice media file is a captioned type and a caption-less type. A pre-processing device processing a caption is selected to process a captioned source slice media file, and a pre-processing device processing a video is selected to process a caption-less source slice media file.

The method for determining the pre-processing device corresponding to the source slice media file from the pre-processing device cluster is merely an optional example, and does not constitute a limitation to the claims of the disclosure.

Optionally, the processing the source slice media file according to the image area processing result, to obtain a processed target slice media file may include: obtaining, by the transcoding device, a key area in at least one frame image included in the source slice media file according to the image area processing result: and performing a first operation on the key area, and perforating a second operation on areas other than the key area.

Optionally, the processing the source slice media file according to the image area processing result, to obtain a processed target slice media file may include: obtaining, by the transcoding device, a key time period included in the source slice media file according to the image area processing result; and performing a first operation on the key time period, and performing a second operation on a time period other than the key time period.

Optionally, the key time period may be one or more segments in the source slice media file, the first operation may be increasing a bit rate, and the second operation may be reducing a bit rate. For example, the image area processing result indicates that the $3^{rd}$ second to the $7^{th}$ second and the $11^{th}$ second to the $14^{th}$ second of the source slice media file are key time periods, and other time periods are non-key time periods. Bit rates of files from the $3^{rd}$ second to the $7^{th}$ second and the $11^{th}$ second to the $14^{th}$ second of the source slice media file are increased, and bit rates of other, non-key time periods are reduced.

That the first operation is increasing a bit rate and the second operation is reducing a hit rate is merely an optional operation. This is not specifically limited in this embodiment.

In this embodiment of the disclosure, by means of the method of obtaining, by a transcoding device, a source slice media file included in a source multimedia file and a slice pre-processing result corresponding to the source slice media file; obtaining an image area processing result corresponding to the source slice media file according to a storage address indicated in the slice pre-processing result; and processing the source slice media file according to the image area processing result, to obtain one image area processing result for each source slice media file, each source slice media file in the source multimedia file may be processed according to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

In an optional implementation, the foregoing apparatus further includes: a fourth obtaining unit, configured to obtain a slice pre-processing task corresponding to the source slice media file before the source slice media file in the source multimedia file is obtained. The apparatus also includes a first transmission unit, configured to: transmit the source slice media file and the slice pre-processing task to the pre-processing device, so that the pre-processing device performs key area recognition on at least one frame image included in the source slice media file according to the slice pre-processing task, and stores the image area processing result obtained through the key area recognition.

In this embodiment, before a source slice media file included in a source multimedia file and a slice pre-processing result corresponding to the source slice media file are obtained, a slice pre-processing task corresponding to the source slice media file is obtained, and key area recognition is performed on at least one frame image in the source slice media file by using a pre-processing device. Therefore, in a process of processing the source slice media file, a policy for processing the source slice media file is determined, and the source slice media file is flexibly processed.

In an optional implementation, the foregoing apparatus further includes: a determination unit, configured to determine the pre-processing device corresponding to the source slice media file from a pre-processing device cluster before the source slice media file and the slice pre-processing task are transmitted to the pre-processing device, a ratio of a quantity of source slice media files in the source multimedia file to a quantity of pre-processing devices in the pre-processing device cluster being N:M, N being a natural number greater than 1, and M being a natural number greater than 1.

In this embodiment of the disclosure, a pre-processing device corresponding to a source slice media file is determined from a pre-processing device cluster, thereby ensuring that each source slice media file is processed by using one pre-processing device. In addition, because there are a plurality of pre-processing devices, the efficiency of processing the source slice media file is improved.

In an optional implementation, the processing unit includes: an obtaining module, configured to obtain a key area in a frame image included in the source slice media file according to the image area processing result. The processing unit also includes an execution module, configured to perform a first operation on the key area, and perform a second operation on areas other than the key area in the frame image included in the source slice media file, the first operation and the second operation being different operations.

In this embodiment, a key area in a frame image included in a source slice media file is obtained according to an image area processing result, a first operation is performed on the key area, and a second operation is performed on other areas, so as to perform different operations on different areas in the source slice media file, thereby improving the flexibility of processing the source slice media file.

In an optional implementation, the execution module includes: a first performing submodule, configured to perform an encoding processing operation on the key area according to a first bit rate: and a second performing submodule, configured to perform the encoding processing operation on the areas other than the key area in the frame image according to a second bit rate. The first bit rate is greater than the second bit rate.

In this embodiment an encoding processing operation is performed on a key area according to a first bit rate, and the encoding processing operation is performed on areas other than the key area in a frame image according to a second bit rate, so as to perform different operations on different areas in a source slice media file, so that different areas have different display bit rates, thereby improving the flexibility of processing the source slice media file.

In an optional implementation, the foregoing apparatus further includes: a combination unit, configured to: after the source slice media file is processed according to the image area processing result, to obtain a processed target slice media file, combine target slice media files respectively corresponding to source slice media files included in the source multimedia file, to obtain a target multimedia file corresponding to the source multimedia file. The apparatus also includes a second transmission unit, configured to transmit the target multimedia file to a playing client for playing.

In this embodiment, target slice media files respectively corresponding to source slice media files included in a source multimedia file, are combined, to obtain a target multimedia file corresponding to the source multimedia file, and the target multimedia file is transmitted to a playing client for playing, thereby ensuring that a complete target multimedia file may be obtained after a process of processing the source slice media file, and improving the processing accuracy of the source slice media file.

The apparatus for processing a multimedia file is described below with reference to FIG. 7. As shown in FIG. 7, a portion enclosed, by a dashed-line box is not included in related art systems shown outside the dashed-line box. When a source multimedia file is obtained, a source slice media file 1 to a source slice media file n are obtained according to the source multimedia file, where n is a natural number greater than 1. The source slice media files 1 to n are then transmitted to transcoding devices 1 to n. The transcoding devices 1 to n transcode the source slice media files 1 to n, to obtain transcoded media files 1 to n, and combine the transcoded media files 1 to n into a transcoded multimedia file. However, by means of the method, only the source multimedia file is transcoded. In the disclosure, after the source slice media files 1 to n are obtained, steps in the dashed-line box are used to transmit the obtained source slice media files 1 to n to pre-processing devices 1 to m, where in is a natural number greater than 1. The pre-processing devices 1 to m receive slice pre-processing tasks 1 to n allocated to each source slice media file, and analyze the source slice media files 1 to n according to the received slice pre-processing tasks 1 to n, to obtain an image area processing result of each source slice media file. After the image area processing result of each source slice media file is obtained, image area processing results 1 to n are transmitted to the transcoding devices 1 to n. The transcoding devices 1 to n transcode the source slice media files 1 to n according to the image area processing results 1 to n, to obtain target slice media files 1 to n, and combine the target slice media files, to obtain a target multimedia file.

There may be not n transcoding devices. When there are not n transcoding devices, the following two cases exist:

In a case that a quantity of the source slice media files is less than a quantity of the transcoding devices, the source slice media files are processed directly by using the transcoding devices. In a case that a quantity of the source slice media files is greater than a quantity of the transcoding devices, excess source slice media files wait in a queue to be processed.

By means of the foregoing steps, one image area processing result is obtained for each source slice media file, so that each source slice media file in a source multimedia file may be processed according to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

The module and the unit may be, but are not limited to, being located in a same device or different devices. This is not specifically limited in this embodiment.

Figure 10:
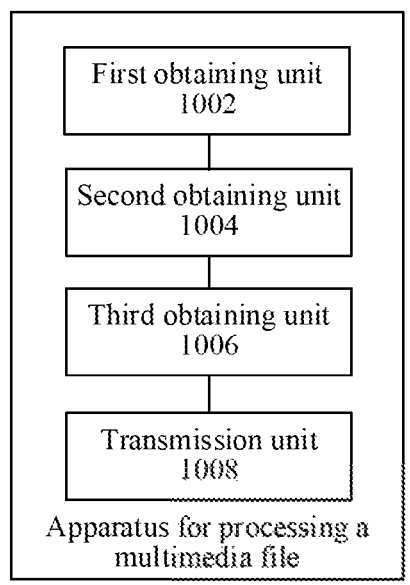
FIG. 10 is a schematic structural diagram of another optional apparatus for processing a multimedia file according to an embodiment of the disclosure.

According to still another aspect of the embodiments of the disclosure, an apparatus for processing a multimedia file implementing the foregoing method for processing a multimedia file is further provided. The apparatus for processing a multimedia file may be a pre-processing device, or may be disposed in the pre-processing device. As shown in FIG. 10, the apparatus for processing a multimedia file includes; a first obtaining unit 1002, configured to obtain a source slice media file included in a source multimedia file, a second obtaining unit 1004, configured to obtain a slice pre-processing task corresponding to the source slice media file; a third obtaining unit 1006, configured to obtain an image area processing result corresponding to the source slice media file according to the slice pre-processing task; and a transmission unit 1008, configured to transmit the image area processing result to a transcoding device, so that the transcoding device processes the source slice media file according to the image area processing result, to obtain a processed target slice media file.

Optionally, the a apparatus for processing a multimedia file may be applied to, but is not limited to, a scenario of processing a video file. A pre-processing device obtains a source slice media file included in a source multimedia file, and a slice pre-processing task corresponding to the source slice media file; obtains an image area processing result corresponding to the source slice media file according to the slice preprocessing task; and transmits the image area processing result to a transcoding device, so that the transcoding device processes the source slice media file according to the image area processing result, to obtain a processed target slice media file.

Optionally, the source slice media file included in the source multimedia file may be obtained through the following step: slicing the source multimedia file into a plurality of source slice media files according to a slice rule.

Optionally, the slice rule may be slicing the source multimedia file according to predetermined duration. For example, one source multimedia file that is 10 minutes and 50 seconds long may be sliced every two minutes from 00:00 of the source multimedia file, and the source multimedia file is sliced into 5 slice media files that are two minutes long and a slice media file that is 50 seconds long. Alternatively, the source multimedia file that is 10 minutes and 50 seconds long may be equally sliced into 5 slice media files according to an average division method, and each slice media file is 2 minutes and 10 seconds long.

The slicing the source multimedia file according to the predetermined duration or by using the average division method is merely an example, and a specific method for slicing the source multimedia file and duration of the slice media file are not limited in this embodiment.

Optionally, the obtaining an image area processing result corresponding to the source slice media file according to the slice pre-processing task includes: performing, by the pre-processing device, key area recognition, on at least one frame image included in the source slice media file according to the slice pre-processing task, and storing the image area processing result obtained through the key area recognition.

Optionally, key areas in the frames may be the same or may be different.

Optionally, the transmitting the image area processing result to a transcoding device includes: obtaining, by the pre-processing device, an obtaining request transmitted by the transcoding device, the obtaining request carrying a storage address of the pre-processing device that stores the image area processing result; and transmitting the image area processing result in the storage address to the transcoding device.

Optionally, the transmitting the image area processing result to a transcoding device includes: after[SYS] the pre-processing device performs the key area recognition on the source slice media file according to the slice pre-processing task, and obtains the image area processing result, directly transmitting, by the pre-processing device, the image area processing result to the transcoding device.

Optionally, before the obtaining a source slice media file included in a source multimedia file, the method further includes: determining the pre-processing device corresponding, to the source slice media file from a pre-processing device cluster, a ratio of a quantity of source slice media files in the source multimedia file to a quantity of pre-processing devices in the pre-processing device cluster being N:M, N being a natural number greater than 1, and M being a natural number greater than 1.

Optionally, a ratio of a quantity of source slice media files to a quantity of pre-processing devices in the pre-processing device cluster being N:M may be that one source slice media file corresponds to one pre-processing device, one source slice media file corresponds to a plurality of pre-processing devices, or a plurality of source slice media files correspond to one pre-processing device.

In this embodiment of the disclosure, a source slice media file in in a source multimedia file and a slice pre-processing task corresponding to the source slice media file are obtained, an image area processing result corresponding to the source slice media file is obtained according to the slice pre-processing task, and a transcoding device processes the source slice media file, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

In an optional implementation, the third obtaining unit includes: a recognition module, configured to perform key area recognition on a frame image included in the source slice media file according to the slice pre-processing task; and a storage module, configured to store the image area processing result obtained through recognition.

In this embodiment of the disclosure, a key area in a source slice media file is recognized and an obtained image area processing result is stored, so as to perform different operations on different areas in the source slice media file, thereby improving the flexibility of processing the source slice media file.

In an optional implementation, the transmission unit includes: an obtaining module, configured to obtain an obtaining request transmitted by the transcending device, the obtaining request carrying a storage address in which the image area processing result is stored, and a transmission module, configured to transmit the image area processing result in the storage address to the transcoding device.

In this embodiment, an obtaining rawest transmitted by a transcoding, device is obtained, and an image area processing result is obtained according to a storage address of the image area processing result in the obtaining request, thereby storing the storage address of the image area processing result in a server, and reducing the load of the pre-processing device.

In an optional implementation, the foregoing apparatus further includes: a determination unit, configured to determine the pre-processing device corresponding to the source slice media file from a pre-processing device cluster before the source slice media file in the source multimedia file and the slice pre-processing task corresponding to the source slice media file are obtained, a ratio of a quantity of source slice media files in the source multimedia file to a quantity of pre-processing devices in the pre-processing device cluster being N:M, N being a natural number greater than 1, and M being a natural number greater than 1.

In this embodiment of the disclosure, a pre-processing device corresponding to a source slice media file is determined from a pre-processing device cluster, thereby ensuring that each source slice media file is processed by using one pre-processing device. In addition, because there are a plurality of pre-processing devices, the efficiency of processing the source slice media file is improved.

The apparatus for processing a multimedia file is described below with reference to FIG. 7. As shown in FIG. 7, a portion enclosed by a dashed-line box is not included in related art systems shown outside the dashed-line box. When a source multimedia file is obtained, a source slice media file 1 to a source slice media file n are obtained according to the source multimedia file, where n is a natural number greater than 1. The source slice media files 1 to n are then transmitted to transcoding devices 1 to n. The transcoding devices 1 to n transcode the source slice media files 1 to n, to obtain transcoded media files 1 to n, and combine the transcoded media files 1 to n into a transcoded multimedia file. However, by means of the method, only the source multimedia file is transcoded. In the disclosure, after the source slice media files 1 to a are obtained, steps in the dashed-line box are used to transmit the obtained source slice media files 1 to n to pre-processing devices 1 to m, where in is a natural number greater than 1. The pre-processing devices 1 to m receive slice pre-processing tasks 1 to n allocated to each source slice media file, and analyze the source slice media files 1 to n according to the received slice pre-processing tasks 1 to n, to obtain an image area processing result of each source slice media file. After the image area processing result of each source slice media file is obtained, image area processing results 1 to n are transmitted to the transcoding devices 1 to n. The transcoding devices 1 to n transcode the source slice media files 1 to n according to the image area processing results 1 to n, to obtain target slice media files 1 to n, and combine the target slice media files, to obtain a target multimedia file.

There may be not ii transcoding devices. When there are not n transcoding devices, tire following two cases exist:

In a case that a quantity of the source slice media files is less than a quantity of the transcoding devices, the source slice media files are processed directly by using the transcoding devices. In a case that a quantity of the source slice media files is greater than a quantity of the transcoding devices, excess source slice media files wait in a queue to be processed.

By means of the foregoing steps, one image area processing result is obtained for each source slice media file, so that each source slice media file in a source multimedia file may be processed according to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

The module and the unit may be, but are not limited to, being located in a same device or different devices. This is not specifically limited in this embodiment.

Figure 11:
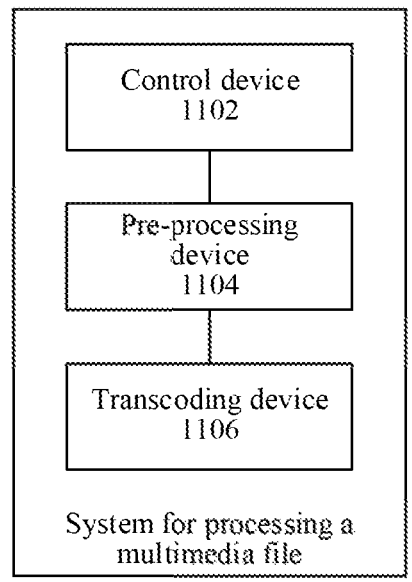
FIG. 11 is a schematic diagram of an optional system for processing a multimedia file according to an embodiment of the disclosure.

According to still another aspect of the embodiments of the disclosure, a system for processing a multimedia file is further provided as shown in FIG. 11, the system for processing a multimedia file includes: a control device 1102, configured to slice a source multimedia file, to obtain plural source slice media files; a pre-processing device 1104, configured to obtain one of the source slice media files and a slice pre-processing task corresponding to the source slice media file, and further configured to obtain an image area processing result corresponding to the source slice media file according to the slice pre-processing task; and a transcoding device 1106, configured to obtain the source slice media file and a slice pre-processing result corresponding to the source slice media file, the slice pre-processing result indicating a storage address of the image area processing result in the pre-processing device, further configured to obtain the image area processing result corresponding to the source slice media file from the storage address, and further configured to process the source slice media file according to the image area processing result, to obtain a processed target slice media file.

Optionally, the system for processing a multimedia file may be applied to, but is not limited to, a scenario of processing a video file. The transcoding device obtains a source slice media file in a source multimedia file, and processes each source slice media file according to an image area processing result, to obtain a processed target slice media file, so as to perform deep learning and processing on each source slice media file. Therefore, a problem that only the entire source multimedia file can be intelligently analyzed in the related art is resolved, and the efficiency of performing intelligent analysis on the source multimedia file and the efficiency of processing the source multimedia file are improved.

The system for processing a multimedia file is described below with reference to FIG. 7. As shown in FIG. 7, a portion enclosed by a dashed-line box is not included in related art systems shown outside the dashed-line box. When a source multimedia file is obtained, a source slice media file 1 to a source slice media file n are obtained according to the source multimedia file, where n is a natural number greater than 1. The source slice media files 1 to n are then transmitted to transcoding devices 1 to n. The transcoding devices 1 to n transmit the source slice media files 1 to n, to obtain transcoded media files 1 to n, and combine the transcoded media files 1 to n into a transcoded multimedia file. However, by means of the method, only the source multimedia file is transcoded. In the disclosure, after the source slice media files 1 to n are obtained, steps in the dashed-line box are used to transmit the obtained source slice media files 1 to n to pre-processing devices 1 to m, where m is a natural number greater than 1. The pre-processing devices 1 to m receive slice pre-processing tasks 1 to n allocated to each source slice media file, and analyze the source slice media files 1 to n according to the received slice pre-processing tasks 1 to n, to obtain an image area processing result of each source slice media file. After the image area processing result of each source slice media file is obtained, image area processing results 1 to n are transmitted to the transcoding devices 1 to n. The transcoding devices 1 to n transcode the source slice media files 1 to n according to the image area processing results 1 to n, to obtain target slice media files 1 to n, and combine the target slice media files, to obtain a target multimedia file.

There may be not a transcoding devices. When there are not a transcoding devices, the following two cases exist:

In a case that a quantity of the source slice media files is less than a quantity of the transcoding devices, the source slice media files are processed directly by using the transcoding devices. In a case that a quantity of the source slice media files is greater than a quantity of the transcoding devices, excess source slice media files wait in a queue to be processed.

By means of the foregoing steps, one image area processing result is obtained for each source slice media file, so that each source slice media file in a source multimedia file may be processed according, to the image area processing result, to obtain a target slice media file, so as to intelligently analyze and process each source slice media file in the source multimedia file. Therefore, a problem that only the entire source multimedia file can be intelligently analyzed in the related art is resolved, and the processing efficiency of processing the source multimedia file is improved.

According to still another aspect of the embodiments of the disclosure, a non-transitory computer-readable storage medium is further provided, the storage medium storing a computer program, the computer program being configured to perform all or some of the steps in any one of the foregoing method embodiments when being run.

Optionally, in this embodiment, the storage medium may be configured to store a computer program used for performing the following steps:

In a first step, a source slice media file included in a source multimedia file is obtained.

In a second step, a slice pre-processing result corresponding to the source slice media file is obtained, the slice pre-processing result indicating a storage address of an image area processing result, corresponding to the source slice media file, in a pre-processing device.

In a third step, the image area processing result corresponding to the source slice media file is obtained from the storage address.

In a fourth step, the source slice media file is processed according to the image area processing result, to obtain a processed target slice media file.

Optionally, in this embodiment, the storage medium may be configured to store a computer program used for performing the following steps:

In a first step, a source slice media file included in a source multimedia file is obtained.

In a second step, a slice pre-processing task corresponding to the source slice media file is obtained.

In a third step, an image area processing result corresponding to the source slice media file is obtained according to the slice pre-processing task.

In a fourth step, the image area processing result is transmitted to a transcoding device, so that the transcoding device processes the source slice media file according to, the image area processing result, to obtain a processed target slice media file.

Optionally, the storage medium is further configured to store a computer program for performing steps included in the method in the foregoing embodiments. This is not described again in this embodiment.

Figure 12:
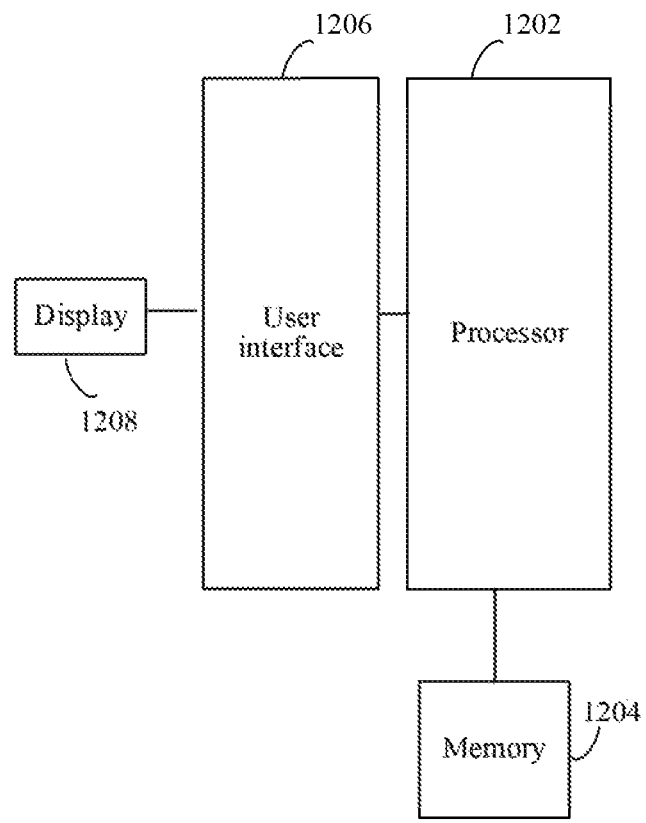
FIG. 12 is a schematic structural diagram a an optional electronic apparatus according to an embodiment of the disclosure.

According to still another aspect of the embodiments of the disclosure, an electronic apparatus configured to implement the foregoing method for processing a multimedia file is further provided. As shown in FIG. 12, the apparatus includes a memory and a processor (e.g., processing circuitry), the memory storing a computer program, and the processor being configured to perform the steps in any one of the foregoing method embodiments by using the computer program.

Optionally, in this embodiment, the foregoing electronic apparatus may be located in at least one of a plurality of network devices in a computer network.

Optionally, in this embodiment, the processor may be configured to perform the following steps by using the computer program:

In a first step, a source slice media file included in a source multimedia file is obtained.

In a second step, a slice pre-processing result corresponding to the source slice media file is obtained, the slice pre-processing result indicating a storage address of an image area processing result, corresponding to the source slice media file, in a pre-processing device.

In a third step, the image area processing result corresponding to the source slice media file is obtained from the storage address.

In a fourth step, the source slice media file is processed according to the image area processing result, to obtain a processed target slice media file.

Alternatively, in this embodiment, the processor may be configured to perform the following steps by using the computer program:

In a first step, a source slice media file, included in a source multimedia file, is obtained.

In a second step, a slice pre-processing task corresponding to the source slice media file is obtained.

In a third step, an image area processing result corresponding to the source slice media file is obtained according to the slice pre-processing task.

In a fourth step, the image area processing result is transmitted to a transcoding device, so that the transcoding device processes the source slice media file according to the image, area processing result, to obtain a processed target slice media file.

Optionally, the structure shown in FIG. 12 is only schematic and exemplary. The electronic apparatus may be a terminal device such as a smartphone (such as an Android mobile phone or an iOS mobile phone), a tablet computer, a palmtop computer, a mobile Internet device (MID), or a Personal digital assistant (PDA)$_{[SY6]}$. FIG. 12 does not limit the structure of the foregoing electronic apparatus. For example, the electronic apparatus may further include more or fewer components (such as a network interface) than those shown in FIG. 12, or has a configuration different from that shown in FIG. 12.

The memory 1204 may be configured to store a software program and a module, for example, a program instruction/module corresponding to the method, the apparatus, and the system for processing a multimedia file in the embodiments of the disclosure, and the processor 1202 performs various functional applications and data processing by running the software program and the module stored ire the memory 1204, that is, implementing the foregoing method for processing a multimedia file. The memory 1204 may include a high-speed random memory, and may further include a non-volatile memory such as one or more magnetic storage apparatuses, a flash, or another non-volatile solid-state memory. In some examples, the memory 1204 may further include memories remotely disposed relative to the processor 1202, and the remote memories may be connected to a terminal through a network. Instances of the network include, but are not limited to, the Internet, an intranet, a local area network, a mobile communications network, and a combination thereof.

The user interface 1206 is configured to receive or transmit data through a network. Specific instances of the foregoing network may include a wired network and a wireless network. In an example, the user interface 1206 includes a network interface controller (NIC) The NIC may be connected to another network device and a router by using a network cable, so as to communicate with the Internet or the local network. In an example, the user interface 1206 is a radio frequency (RF) module, and is configured to wirelessly communicate with the Internet.

Optionally, in this embodiment, all or some of the steps of the methods in the foregoing embodiments may be Implemented by a program instructing relevant hardware of the terminal device. The program may be stored in a non-transitory computer-readable storage medium. The storage medium may include a flash disk, a read-only memory (ROM), a random access memory (RAM), a magnetic disk, an optical disc, and the like.

The sequence of the foregoing embodiments of the disclosure are merely for the convenience of description, and do not imply the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of the disclosure may be implemented in a form of a software product. The computer software product is stored in a storage medium and includes several instructions for instructing one or more computer devices (which may be a PC, a server, a network device, or the like) to perform all or some of operations of the methods in the embodiments of the disclosure.

In the foregoing embodiments of the disclosure, descriptions of the embodiments have different emphases, and as for parts that are not described in detail in one embodiment, reference can be made to the relevant descriptions of the other embodiments.

In the several embodiments provided in the disclosure, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the disclosure may be integrated into one processing circuitry unit, or each of the units may exist alone physically, or two or more units are integrated into one unit. The integrated unit may be implemented in the form of hardware, or may be implemented in the form of software functional unit.

The above descriptions are merely optional implementations of the disclosure, and a person of ordinary skill in the art can make various improvements and refinements without departing from the spirit of the disclosure. All such modifications and refinements are to also be intended to be covered by the disclosure.

INDUSTRIAL APPLICABILITY

In the embodiments of the disclosure, by means of the method of obtaining a source slice media file included in a source multimedia file; obtaining a slice preprocessing result corresponding to the source slice media file, the slice pre-processing result being used for indicating, a storage address of an image area processing result, corresponding to the source slice media file, in a pre-processing device; obtaining the image area processing result corresponding to the source slice media file from the storage address; and processing the source slice media file according to the image area processing result, to obtain a processed target slice media file, the image area processing result corresponding to the source slice media file is obtained, and the source slice media file is directly processed according to the image area processing result. The source multimedia file is sliced, to obtain the source slice media file, and a plurality of source slice media files are simultaneously processed by using a distributed transcoding device and a distributed pre-processing device, so that a problem of relatively low processing efficiency caused by only performing intelligent analysis on the entire source multimedia file in the related art is solved, thereby improving the efficiency of intelligently processing the source multimedia file.

What is claimed is:

1. A method for processing a multimedia file, comprising:
obtaining, by processing circuitry of a transcoding device, a slice pre-processing result corresponding to a source slice media file included in a source multimedia file, the slice pre-processing result indicating a storage address of an image area processing result identifying key areas in plural frames of the source slice media file, by a pre-processing device selected from a pre-processing device cluster;
obtaining, by the processing circuitry of the transcoding device, the image area processing result identifying the key areas in the plural frames of the source slice media file from the storage address in the pre-processing device selected from the pre-processing device cluster, the image area processing result being obtained through a key area recognition process in parallel with one or more other image area processing results obtained by one or more other pre-processing devices from the pre-processing device cluster by performing the key area recognition process on other source slice media files of the source multimedia file; and
processing, by the processing circuitry of the transcoding device, the source slice media file according to the image area processing result by obtaining a key time period included in the source slice media file according to the image area processing result performing a first operation on the key time period, performing a second operation on a time period other than the key time period, processing the identified key areas in the plural frames at a first bit rate and processing other areas in the frames of the source slice media file at a second bit rate, to obtain a processed target slice media file.

2. The method according to claim 1, wherein the method further comprises:
transmitting, by a control device, a slice pre-processing task corresponding to the source slice media file to the pre-processing device, the slice pre-processing task causing the pre-processing device to perform the key area recognition process on at least one frame image of the source slice media file according to the slice pre-processing task, and to store the image area processing result obtained through the key area recognition process.

3. The method according to claim 2, wherein, before the transmitting, the method further comprises:
selecting, by the control device, the pre-processing device corresponding to the source slice media file from the pre-processing device cluster, a ratio of a quantity of source slice media files in the source multimedia file to a quantity of pre-processing devices in the pre-processing device cluster being 1 or greater than 1.

4. The method according to claim 1, wherein the processing the source slice media file comprises:
performing, by the processing circuitry of the transcoding device, an encoding processing operation on the key areas according to the first bit rate; and
performing, by the processing circuitry of the transcoding device, the encoding processing operation on the other areas according to the second bit rate,
the first bit rate being greater than the second hit rate.

5. The method according to claim 1, wherein, after the processing, the method further comprises:
combining, by the processing circuitry of the transcoding device, target slice media files respectively corresponding to source slice media files included in the source multimedia file, to obtain a target multimedia file corresponding to the source multimedia file; and
transmitting the target multimedia file to a client.

6. The method according to claim 1, wherein the obtaining the image area processing result includes obtaining the one or more other image area processing results corresponding to the other source slice media files of the source multimedia file respectively from the one or more other pre-processing devices of the pre-processing device cluster, the one or more other pre-processing devices outputting the one or more other image area processing results in parallel.

7. A non-transitory computer-readable storage medium, storing computer-readable instructions, which, when executed by the processing circuitry of the transcoding device, causes the transcoding device to perform the method according to claim 1.

8. A method for processing a multimedia file, comprising:
obtaining, by processing circuitry of a pre-processing device selected from a pre-processing device cluster, a slice pre-processing task corresponding to a source slice media file included in a source multimedia file;
obtaining, by the processing circuitry of the pre-processing device, an image area processing result identifying key areas in plural frames of the source slice media file by the pre-processing device according to the slice pre-processing task; and
transmitting the image area processing result identifying the key areas in the plural frames to a transcoding device in parallel with one or more other pre-processing devices of the pre-processing device cluster transmitting one or more other image area processing results obtained by performing a key area recognition process on other source slice media files of the source multimedia file, so that the transcoding device processes the source slice media file according to the image area processing result by obtaining a key time period included in the source slice media file according to the image area processing result, performing a first operation on the key time period, performing a second operation on a time period other than the key time period, processing the identified key areas in the plural frames at a first bit rate and processing other areas in the frames of the source slice media file at a second hit rate, to obtain a processed target slice media file in parallel with the processing of the one or more other image area processing results corresponding to the other source slice media files.

9. The method according to claim 8, wherein the obtaining, by the processing circuitry of the pre-processing device, the image area processing result corresponding to the source slice media file according to the slice pre-processing task comprises:
performing, by the processing circuitry of the pre-processing device, the key area recognition process on a frame image included in the source slice media file according to the slice pre-processing task; and
storing the image area processing result obtained through the key area recognition process.

10. The method according to claim 8, wherein the transmitting comprises:
obtaining an obtaining request transmitted by the transcoding device, the obtaining request carrying a storage address used for indicating the image area processing result; and
transmitting, by the processing circuitry of the pre-processing device, the image area processing result in the storage address.

11. The method according to claim 8, wherein the method further comprises:
determining, by a control device, the pre-processing device corresponding to the source slice media file from the pre-processing device cluster, a ratio of a quantity of source slice media files in the source multimedia file to a quantity of pre-processing devices in the pre-processing device cluster being 1, or greater than 1.

12. A non-transitory computer-readable storage medium, storing computer-readable instructions, which, when executed by the processing circuitry of the pre-processing device, causes the pre-processing device to perform the method according to claim 8.

13. An apparatus for processing a multimedia file, comprising: processing circuitry configured to
obtain a slice pre-processing result corresponding to a source slice media file in a source multimedia file, the slice pre-processing result indicating a storage address of an image area processing result identifying key areas in plural frames of the source slice media file, by a pre-processing device selected from a pre-processing device cluster;
obtain the image area processing result identifying the key areas in the plural frames of the source slice media file from the storage address in the pre-processing device selected from the pre-processing device cluster, the image area processing result being obtained through the key area recognition process in parallel with one or more other image area processing results obtained by one or more other pre-processing devices from the pre-processing device cluster by performing a key area recognition process on other source slice media files of the source multimedia file; and
process the source slice media file according to the image area processing result by obtaining a key time period included in the source slice media file according to the image area processing result, performing a first operation on the key time period, performing a second operation on a time period other than the key time period, processing the identified key areas in the plural frames at a first bit rate and processing other areas in the frames of the source slice media file at a second hit rate, to obtain a processed target slice media file.

14. The apparatus according to claim 13, wherein the image area processing result is obtained by the pre-processing device by performing the key area recognition process on at least one frame image of the source slice media file.

15. The apparatus according to claim 14, wherein a ratio of a quantity of source slice media files in the source multimedia file to a quantity of pre-processing devices in the pre-processing device cluster being 1 or greater than 1.

16. The apparatus according to claim 13, wherein the processing circuitry is further configured to obtain the one or more other image area processing results corresponding to the other source slice media files of the source multimedia file respectively from the one or more other pre-processing devices of the pre-processing device cluster, the one or more other pre-processing devices outputting the one or more other image area processing results in parallel.

17. The apparatus according to claim 13, wherein the processing circuitry performs the processing of the source slice media file by
performing an encoding processing operation on the key areas according to the first hit rate; and
performing the encoding processing operation on the other areas according to the second bit rate,
the first hit rate being greater than the second bit rate.

* * * * *